(12) United States Patent
Kruse et al.

(10) Patent No.: US 7,171,330 B2
(45) Date of Patent: Jan. 30, 2007

(54) ROTATION AND/OR TILT ANGLE DETECTION MEANS FOR A BALL AND SOCKET JOINT

(75) Inventors: Jochen Kruse, Osnabrück (DE); Joachim Spratte, Osnabrück (DE); Michael Klank, Osnabrück (DE); Oliver Hagedorn, Hamburg-Heimfeld (DE); Horst Dötsch, Osnabrück (DE)

(73) Assignee: ZF Lemförder Metallwaren AG (DE)

( * ) Notice: Subject to any disclaimer, the term of this patent is extended or adjusted under 35 U.S.C. 154(b) by 163 days.

(21) Appl. No.: 10/912,701

(22) Filed: Aug. 5, 2004

(65) Prior Publication Data
US 2005/0007225 A1    Jan. 13, 2005

Related U.S. Application Data

(63) Continuation of application No. PCT/DE03/03102, filed on Sep. 17, 2003.

(30) Foreign Application Priority Data
Sep. 18, 2002   (DE)   ................ 102 43 399

(51) Int. Cl.
    *F16D 1/12*   (2006.01)
(52) U.S. Cl. .................................... 702/151
(58) Field of Classification Search ........... 702/151, 702/154
    See application file for complete search history.

(56) References Cited

U.S. PATENT DOCUMENTS

| 4,931,634 | A | * | 6/1990 | Toyama |
| 5,513,847 | A | * | 5/1996 | Hu et al. .................. 473/140 |
| 5,861,876 | A | * | 1/1999 | Nakayama |
| 6,382,865 | B1 | * | 5/2002 | Paxman .................. 403/131 |
| 6,521,884 | B1 | * | 2/2003 | Breda |

FOREIGN PATENT DOCUMENTS

| EP | 0 319 172 | * | 6/1989 |
| EP | 0 617 260 A1 | * | 9/1994 |
| EP | 0 617 260 B1 | * | 9/1994 |
| FR | 2 784 456 | * | 4/2000 |
| JP | 11-271014 | * | 10/1999 |

\* cited by examiner

*Primary Examiner*—Bryan Bui
*Assistant Examiner*—Tung Lau
(74) *Attorney, Agent, or Firm*—McGlew & Tuttle, PC

(57) ABSTRACT

A rotation and/or tilt angle detection device for a ball and socket joint is provided wherein at least one magnet (2), especially a permanent magnet, is arranged in the joint ball (1*a*), wherein a display device (4) displays the magnetic field of the at least one magnet (2) by means of the magnetooptic effect. An image detection deice (10) detects the information displayed by the display device (4). A data processing unit (50) calculates the relative position of the joint ball (1*a*) and the ball socket (3) of the ball and socket joint on the basis of the information detected.

21 Claims, 2 Drawing Sheets

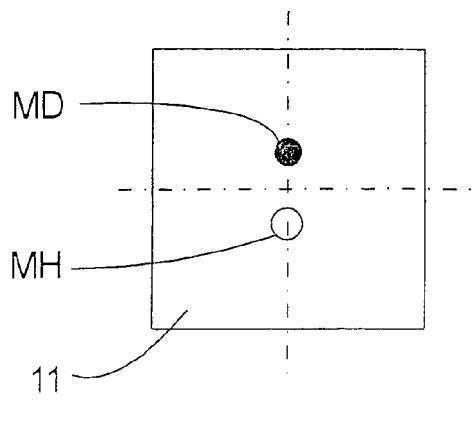
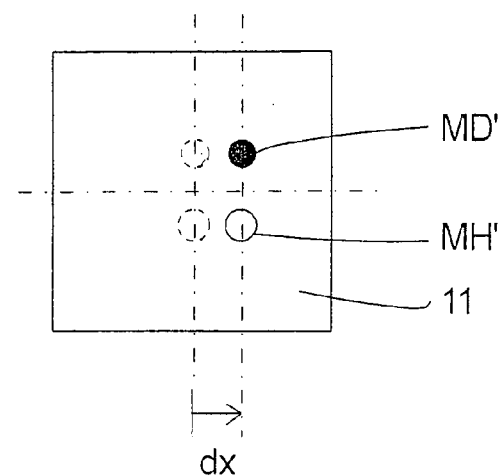
Fig. 2
Fig. 3
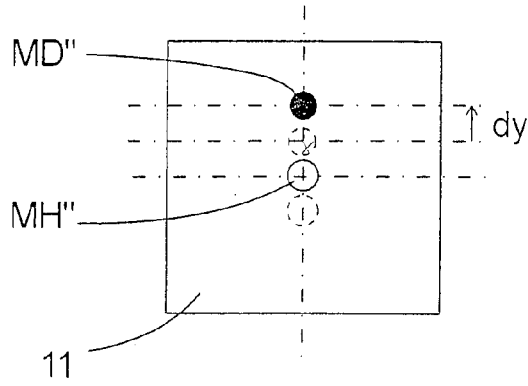
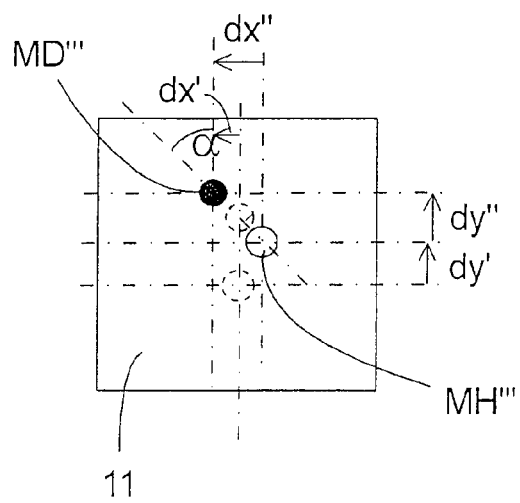
Fig. 4
Fig. 5

ROTATION AND/OR TILT ANGLE DETECTION MEANS FOR A BALL AND SOCKET JOINT

CROSS REFERENCE TO RELATED APPLICATION

This is a continuation of and claims the benefit (35 U.S.C. § 120 and 365(c)) of copending International Application PCT/DE 2003/003102 of Sep. 17, 2003, which designated inter alia the United States and which claims the priority of German Application DE 102 43 399.2 of Sep. 18, 2002. The entire contents of each application is hereby incorporated by reference in its entirety.

FIELD OF THE INVENTION

The present invention pertains to a rotation angle and tilt angle detection means for a ball and socket joint.

BACKGROUND OF THE INVENTION

Ball and socket joints are important mechanical components, because they allow three degrees of freedom. Only joysticks and vehicle components shall be mentioned here as examples of two typical applications of ball and socket joints. However, the measurement of the rotation and tilt angles has been an essential problem for the use of ball and socket joints so far. A great variety of rotation angle sensors have been known for the measurement of the rotation angle. They use mostly a stationary magnetic field, in which a sensor is arranged, whose resistance changes as a function of the rotary movement of the ball and socket joint. The drawback of these sensors is that they determine exclusively the rotary movement and do not detect the tilting movement of the ball and socket joint. If the tilting movement is to be detected as well, a complicated coupling of a plurality of sensors is disadvantageously necessary.

Thus, a measuring means with a magnetoresistive sensor for the contactless, continuous measurement of the change in the position of a motor vehicle body, in which a permanent magnet is arranged in the upper apex of a ball head of a ball and socket joint and the sensor is arranged in the area below the apex of the opening of the ball and socket joint socket, is known from the European Patent EP 0 617 260 B1.

Sensors operating on the basis of Hall sensors disadvantageously have a high sensitivity to external magnetic fields and temperature changes. It is also disadvantageous in case of the use of Hall sensors that the aging of the exciting magnets is not compensated. Furthermore, the calculation of the rotation and tilt angles is very complicated, and it is necessary to record a characteristic diagram in most cases.

SUMMARY OF THE INVENTION

The object of the present invention is therefore to provide a sensor of a relatively simple design or a simple sensor array by means of which the rotary and tilting movement of a ball and socket joint can be determined.

According to the invention a rotation and/or tilt angle detection device is provided for and in combination with a ball and socket joint. The ball and socket joint has a ball pivot mounted rotatably and pivotably in a ball socket and has a joint ball and a pivot. At least one magnet, especially a permanent magnet, is arranged in the joint ball. A display device based on the magnetooptic effect for displaying the magnetic field of the at least one magnet is provided as well as an image detection means for detecting the information displayed by the display device. A data processing unit is operatively connected to detection means for calculating the position of the ball pivot in relation to the ball socket on the basis of the information detected.

The automobile industry has a great interest in sensors that detect the position of the wheel in relation to the road. The ball and socket joint images this position. Thus, ball and socket joints are used, e.g., in the front axle of vehicles, and the ball and socket joint is arranged, for example, between the axle guide and the wheel bearing housing. The ball and socket joint is rotated by steering movements. In contrast, it performs a tilting movement during inward deflection.

The means according to the present invention makes it possible to detect both the rotary and tilting movement of the ball and socket joint, and the sensor advantageously operates in a contactless manner. The present inventions makes provisions for at least one magnet to be arranged at or in the joint ball or the ball pivot. The resulting magnetic field generated is made visible by means of a magnetooptic effect. An optical detection means then determines the visualized magnetic field, and the rotation or tilting of the ball and socket joint can be determined by the magnetic field, which is altered in relation to the initial position.

Two permanent magnets are advantageously arranged in the pole area of the joint ball in parallel to and at a certain distance from one another. The magnets may be manufactured, in principle, from any desired material and have any desired shape, especially a rod shape. NdFeB magnets, which have a diameter of 1 mm and a length of 2 mm, are advantageously used, one magnet with its north pole being directed toward the surface of the joint ball and the other magnet being directed with its south pole toward the surface of the joint ball. It is possible for the pole area of the joint ball to be flattened. A space is formed as a result between the outer surface of the ball and the ball socket, which space can be used as a grease space or grease depot. If this space is filled with lubricating grease, it is guaranteed that the ball and socket joint will continuously lubricate itself. It is possible in case of such an embodiment of the ball and socket joint for the display device to be arranged in the form of a magnetooptic plate directly behind the grease space or to form a wall area of the grease space itself. The magnetic field generated by the magnets is advantageously not affected adversely or deflected in the latter case by the material of the bearing shell. As a result, the resulting magnetic field of the at least one magnet can be displayed or detected relatively accurately. The display device may also be provided at the ball and socket joint housing or made in one piece therewith.

The display device advantageously has a magnetooptic sensor layer, which is arranged according to the present invention, as was described above, in the immediate vicinity of the magnet, especially at a distance of only a few mm or a few tenths of one mm from the magnet. The display device may be integrated with the bearing shell, e.g., during the process of manufacturing the bearing shell. However, it may also be fixed or fastened to the bearing shell as a separate module together with the optical detection and/or evaluation means.

In order for a rotation and tilting of the ball and socket joint to be better detectable, the magnets should not be arranged too close to one another. The distance also depends, among other things, on the distance and the thickness of the magnetooptic sensor layer.

Embodiments according to the present invention will be explained in greater detail below on the basis of drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 2 is the resulting magnetic field of the two permanent magnets shown in FIG. 1, which is displayed by means of the magnetooptic effect, with the ball and socket joint in its starting position;

FIG. 3 is the displayed magnetic field with the ball and socket joint tilted in direction X;

FIG. 4 is a displayed magnetic field with the ball and socket joint tilted in direction Y; and FIG. 5 is the displayed magnetic field with the ball and socket joint tilted in direction X and twisted at the same time.

DESCRIPTION OF THE PREFERRED EMBODIMENTS

Figure 1:
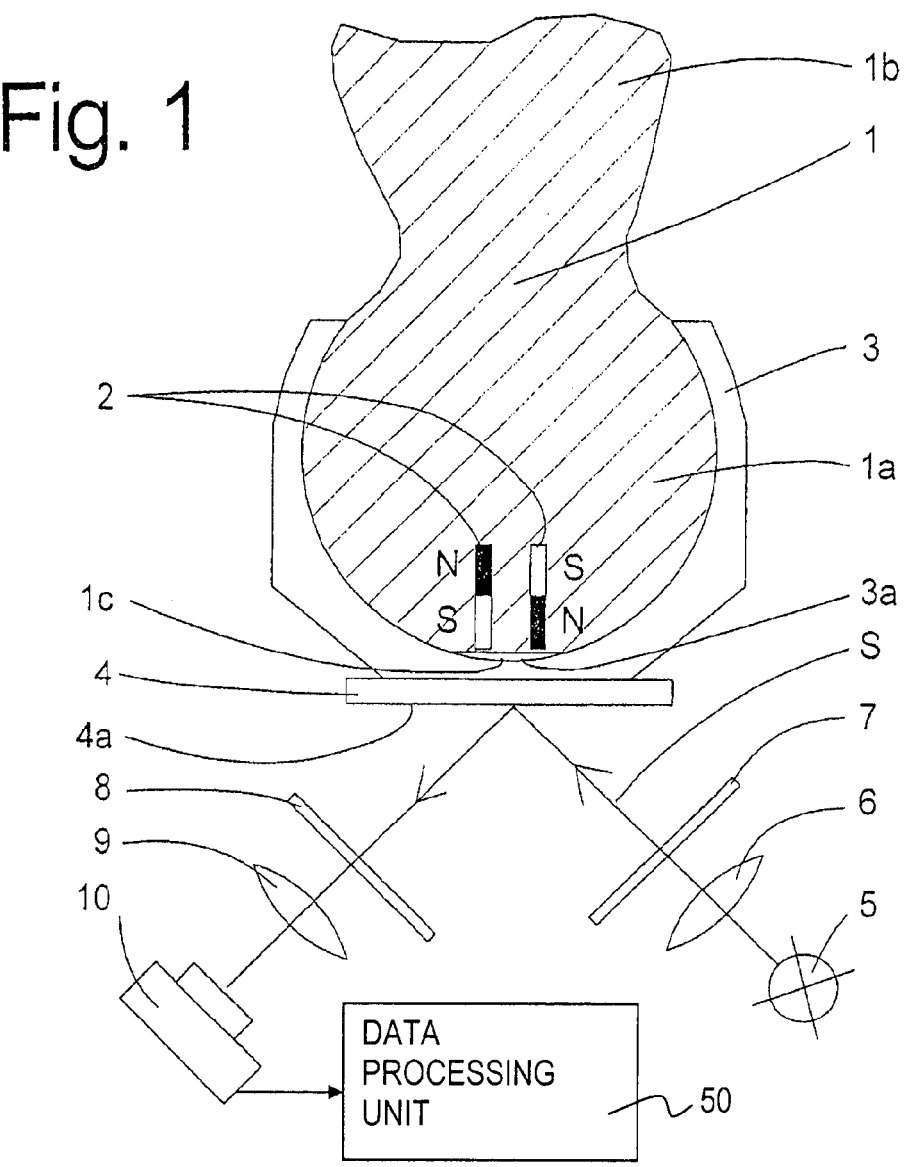
FIG. 1 is a cross-sectional view through a ball and socket joint with a rotation and/or tilt angle detection means according to the present invention.

FIG. 1 shows a cross-sectional view through a ball and socket joint with a rotation and/or tilt angle detection means according to the present invention. The ball and socket joint comprises a ball pivot 1, which is inserted into a bearing shell (ball socket 3) with its joint ball 1a made in one piece with the pivot 1b. The pole face 1c of the joint ball 1a is flattened, so that a free space 3a, which can be used as a grease space or grease depot, is formed between the joint ball 1a and the bearing shell 3. Two permanent magnets 2 are arranged at spaced locations and in parallel to one another in the joint ball 1a in the pole area, one permanent magnet 2 being directed or pointing with its north pole N and the other permanent magnet 2 with its south pole S in the direction of the pole face 1c. The permanent magnets 2 may either be inserted into openings and firmly connected with the joint ball 1a, e.g., by means of an adhesive. However, it is also possible to integrate or to cast the magnets 2 during the process of manufacturing the ball pivot 1.

The display device 4 in the form of a magnetooptic plate is arranged under the pole face or in the immediate vicinity of the magnets 2. The grease space 3a as well as the material of the bearing shell 3 is located between the plate 4 and the magnets in FIG. 1. It is also possible in an alternative embodiment for the plate 4 to form a wall area of the grease space 3a, so that there is no bearing shell material between the plate 4 and the magnet 2. Corresponding magnetooptic plates based on the magnetooptic Faraday effect are sufficiently described in the literature and will not therefore be explained in greater detail here. The optical plate changes its optical properties depending on the magnetic field intensity. The magnets 2 generate a magnetic field, so that the magnetic field intensity changes over the optical plate. If the plate is exposed to light, the electromagnetic waves are reflected differently as a function of the magnetic field, so that an image can be detected in the reflected path of rays, and the magnetic field in the area of the optical plate can be inferred from this image, as a result of which the relative position of the ball and socket joint can in turn be calculated. An illuminating means 5, whose rays S reach the optical plate 4 through a lens 6 and a polarizer 7 at an angle, is used for the illumination, and these rays are reflected from the plate 4 more or less well correspondingly or as a function of the particular magnetic field prevailing at the reflection point and reach the image detection sensor 10 via a polarizing filter called an analyzer 8 and a lens 9. The polarizer 7 and the analyzer 8 are arranged rotated by an angle of 45° in relation to one another. The evaluating electronic unit 50, which performs a calculation as to the rotation or tilting of the ball and socket joint on the basis of the image information obtained, is shown in FIG. 1. The image information converted by the image detection sensor or the image detection means 10 into digital signals is shown as an example in FIGS. 2 through 5.

The illuminating means 5 may be formed by light-emitting diodes (LEDs) or even by another, externally arranged light source, whose rays are sent, e.g., by means of an optical light guide to the needed location. The image detection means may be, for example, a commercially available CCD chip (CCD=charge coupled device).

Figure 1A:
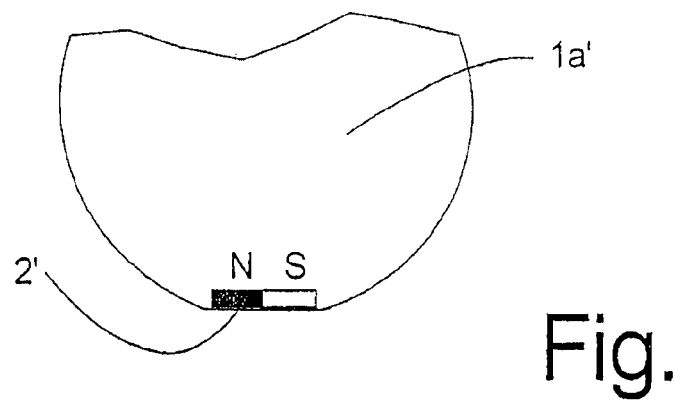
FIG. 1a is an alternative arrangement of a permanent magnet in a joint ball.

FIG. 1a shows an alternative arrangement of an individual permanent magnet 2' in the pole area of a joint ball 1a'. The magnet 2' is arranged in this embodiment in parallel to the flattened pole face, so that the south and north poles of the magnet generate the necessary magnetic field intensity differences in the area of the optical plate, not shown.

FIG. 2 shows the image information 11 that can be determined, which is obtained on the optical plate due to the magnetic field intensity difference. The ball and socket joint is now located in its zero position, i.e., it is neither rotated nor tilted. The north pole of one permanent magnet causes a positive Faraday rotation, whereas the south pole induces a negative Faraday rotation. Due to the fact that the polarizer 7 and the analyzer 8 are arranged rotated by 45° in relation to one another, the photoresponse curve is linear, as a result of which the sensor (CCD sensor) determining the image information detects more or less light depending on the sign of the magnetization. The north pole of one magnet thus generates a dark spot MD and the south pole a light spot MH. If the starting position of the dark and light spots MD and MH are known, the rotation and tilt of the ball and socket joint can be calculated, as is shown in FIGS. 3 through 5, from the relative displacements of these spots.

FIGS. 3 through 5 show the starting positions of the light and dark spots MD and MH in broken lines. The starting positions are preferably stored in a storage for constant values after calibration. FIG. 3 shows the tilting of the ball and socket joint in direction X. The dark spot MD' as well as the light spot MH' migrate both to the right and are shifted by the wavelength dx. If the geometry of the ball and socket joint as well as of the rotation and tilt detection means is known, the tilt can be calculated from the shift dx. The dark and light spots MD" and MH" are analogously shifted in direction Y, as is shown in FIG. 4.

If the ball and socket joint is tilted and rotated, the relative position of the spots MD''' and MH''' changes again in relation to the starting position, and the rotation angle α as well as the tilt in the directions X and Y can be calculated from the relative displacements and distances dx', dx" as well as dy' and dy". The rotation angle α of the ball and socket joint is obtained from the angle between the lines connecting the shifted spots MD''' and M''' as well as the spots indicated by broken lines.

It is obvious that it is also possible to use more than two permanent magnets. However, it shall be borne in mind in this connection that the distance between the magnets shall not be selected to be too small, so that the light and dark spots can still be determined by the image processing software with sufficient sharpness, so that accurate results or the position of the ball and socket joint can be calculated.

The rotation and/or tilt detection means according to the present invention can, of course, be used for all types and designs of ball and socket joints.

While specific embodiments of the invention have been shown and described in detail to illustrate the application of the principles of the invention, it will be understood that the invention may be embodied otherwise without departing from such principles.

What is claimed is:

1. A rotation and/or tilt angle detection device for a ball and socket joint with a ball pivot, which is mounted rotatably and pivotably in a ball socket and has a joint ball and a pivot, the detection device comprising:
   a magnet arranged in the joint ball;
   a display device based on the magneto-optic effect comprising a magneto-optic plate, said display device displaying the magnetic field of said magnet, said magneto-optic plate being exposed to a magnetic field of said magnet;
   an illuminating means for reflecting light off said magneto-optic plate such that the light is reflected from said display device as a function of the magnetic field;
   an image detection means for receiving the light reflected from said magneto-optic plate and detecting the information displayed by the display device; and
   a data processing unit for calculating the position of the ball pivot in relation to the ball socket on the basis of the information detected.

2. A rotation and/or tilt angle detection device in accordance with claim 1, wherein said magnet is a permanent magnet and further comprising another permanent magnet, said permanent magnet and said another magnet being arranged in the joint ball next to each other and at spaced locations from one another, wherein at least one north pole and one south pole of the magnets are turned toward the surface of the joint ball.

3. A rotation and/or tilt angle detection device in accordance with claim 1, wherein said magneto-optic plate is arranged outside the ball socket of the ball and socket joint or forms an integral part of a bearing shell of the ball and socket joint.

4. A rotation and/or tilt angle detection device in accordance with claim 3, wherein the optical plate is irradiated with polarized electromagnetic waves at a certain angle by said illuminating means, and said image detection unit includes an optical sensor and a polarizing filter, said optical sensor being arranged such that the electromagnetic waves reflected by the optical plate fall on the optical sensor after passing through said polarizing filter.

5. A rotation and/or tilt angle detection device in accordance with claim 4, further comprising lenses arranged in the path of rays of the electromagnetic waves to bundle and/or focus them.

6. A ball and socket joint in accordance with claim 4, further comprising lenses arranged in the path of rays of the electromagnetic waves to bundle and/or focus them.

7. A rotation and/or tilt angle detection device in accordance with claim 1, wherein the angle of rotation and/or the tilt angle of the ball and socket joint is determined by the data processing unit on the basis of the relative change in and/or the absolute position of light and/or dark spots, which are displayed by means of said display device and which are generated by the magnetic fields of at least two poles of one or more said magnet.

8. A rotation and/or tilt angle detection device in accordance with claim 1, wherein the amount of inward excursion of a motor vehicle can be determined by means of the rotation and/or tilt angle detection device.

9. A rotation and/or tilt angle detection device in accordance with claim 1, wherein the display device seals a grease space toward an outside of the ball and socket joint.

10. A rotation and./or tilt angle detection device in accordance with claim 9, wherein the display device forms a wall area of the grease space.

11. A rotation and tilt angle detection means in accordance with claim 1, wherein the display device is integrated into, cast into or fastened to the bearing shell.

12. A rotation and/or tilt angle detection means in accordance with claim 1, wherein the ball pivot consists of a ferromagnetic material.

13. A rotation and/or tilt angle detection means in accordance with claim 1, wherein the ball pivot consists of steel.

14. A rotation and/or tilt angle detection device in accordance with claim 1, wherein said magnet and said illuminating means are arranged on different sides of said magneto-optic plate.

15. A ball and socket joint with rotation and/or tilt angle detection device, the ball and socket joint comprising:
   a ball socket with bearing shell;
   a ball pivot, which is mounted rotatably and pivotably in said ball socket and has a joint ball and a pivot;
   a detection device comprising a magnet arranged in the joint ball, a magneto-optic plate positioned for exposure to a magnetic field of said magnet, said plate changing optical properties depending on the magnetic field intensity, an illumination means for reflecting light off of said magneto-optic plate to provide reflected light affected by said optical properties, an image detection means for receiving the reflected light and a data processing unit for calculating the position of the ball pivot in relation to the ball socket on the basis of the information detected.

16. A ball and socket joint in accordance with claim 15, wherein said magnet is a permanent magnet and further comprising another permanent magnet, said permanent magnet and said another magnet being arranged in the joint ball next to each other and at spaced locations from one another, wherein at least one north pole and one south pole of the magnets are turned toward the surface of the joint ball.

17. A ball and socket joint in accordance with claim 15, wherein said magneto-optic plate is arranged on an outside at the ball socket of the ball and socket joint or forms an integral part of a bearing shell of the ball and socket joint.

18. A ball and socket joint in accordance with claim 17, wherein the optical plate is irradiated with polarized electromagnetic waves at a certain angle by said illumination means, and said image detection unit includes an optical sensor and a polarizing filter, said optical sensor being arranged such that the electromagnetic waves reflected by the optical plate fall on the optical sensor after passing through said polarizing filter.

19. A ball and socket joint in accordance with claim 15, wherein the angle of rotation and/or the tilt angle of the ball and socket joint is determined by the data processing unit on the basis of the relative change in and/or the absolute position of light and/or dark spots, which are displayed by means of said display device and which are generated by the magnetic fields of at least two poles of one or more said magnet.

20. A ball and socket joint in accordance with claim 15, wherein the amount of inward excursion of a motor vehicle can be determined by means of the rotation and/or tilt angle detection device.

21. A ball and socket joint in accordance with claim 15, wherein said plate seals a grease space toward an outside of the ball and socket joint and said plate forms a wall area of the grease space with said display device is integrated into, cast into or fastened to the bearing shell.

* * * * *